(12) United States Patent
Heym et al.

(10) Patent No.: US 8,192,028 B2
(45) Date of Patent: Jun. 5, 2012

(54) PROJECTOR OF AN INFORMATION DISPLAY SYSTEM IN VEHICLES, IN PARTICULAR IN AIRCRAFT

(75) Inventors: Detlef Heym, Achim (DE); Carsten Vogel, Hamburg (DE)

(73) Assignee: Airbus Operations GmbH (DE)

( * ) Notice: Subject to any disclaimer, the term of this patent is extended or adjusted under 35 U.S.C. 154(b) by 819 days.

(21) Appl. No.: 12/228,658

(22) Filed: Aug. 14, 2008

(65) Prior Publication Data
US 2009/0046252 A1 Feb. 19, 2009

(30) Foreign Application Priority Data

Aug. 17, 2007 (DE) .......................... 10 2007 038 881

(51) Int. Cl.
*G03B 21/00* (2006.01)
(52) U.S. Cl. ................ 353/13; 353/11; 353/12; 353/14; 353/94; 359/267
(58) Field of Classification Search .................... 353/11, 353/12, 13, 14, 94; 359/267
See application file for complete search history.

(56) References Cited

U.S. PATENT DOCUMENTS

| 5,500,692 | A | | 3/1996 | Onozuka et al. | |
|---|---|---|---|---|---|
| 5,617,131 | A | * | 4/1997 | Murano et al. | 347/233 |
| 6,312,773 | B1 | * | 11/2001 | Zeiss et al. | 428/13 |
| 6,574,030 | B1 | * | 6/2003 | Mosier | 359/267 |
| 6,829,852 | B1 | * | 12/2004 | Uehran | 40/451 |
| 7,446,675 | B2 | * | 11/2008 | Dutton | 340/945 |
| 2005/0122487 | A1 | * | 6/2005 | Koyama et al. | 353/94 |
| 2005/0254127 | A1 | * | 11/2005 | Evans et al. | 359/497 |
| 2007/0176853 | A1 | * | 8/2007 | Miyano | 345/34 |
| 2008/0012728 | A1 | | 1/2008 | Heym | |
| 2011/0157557 | A1 | * | 6/2011 | Vogel et al. | 353/13 |

FOREIGN PATENT DOCUMENTS

| DE | 1 085 351 | | 7/1960 |
|---|---|---|---|
| DE | 199 25 318 | C1 | 2/2001 |
| DE | 103 08 899 | A1 | 9/2004 |
| DE | 10 2004 007 802 | A1 | 9/2005 |
| DE | 10 2004 031 700 | A1 | 1/2006 |
| EP | 0 605 232 | B1 | 7/1994 |
| JP | 2003 172900 | | 6/2003 |

* cited by examiner

*Primary Examiner* — Georgia Y Epps
*Assistant Examiner* — Kevin Wyatt
(74) *Attorney, Agent, or Firm* — Lerner, David, Littenberg, Krumholz & Mentlik, LLP

(57) ABSTRACT

A projector of an information display system in vehicles, in particular in aircraft, for projecting images comprising information for passengers and/or crew onto a projection area which is arranged in the vehicle, with the use of a projection lens that images the image contents onto the projection area, which images are generated by a light source and a projection means. An LED array comprising LEDs that can be switched on and off independently of each other is provided as a light source and as a projection means. To generate composite variable image contents the LEDs can be individually selected. Between the LED array and the projection lens a separation box comprising several chambers is arranged. The chambers of the separation box are associated with an LED such that the chambers associated with the switched-on LEDs are imaged on the projection area by the projection lens as parts of the compound image determined by the switched-on LEDs.

14 Claims, 1 Drawing Sheet

PROJECTOR OF AN INFORMATION DISPLAY SYSTEM IN VEHICLES, IN PARTICULAR IN AIRCRAFT

BACKGROUND OF THE INVENTION

The present invention relates to a projector of an information display system in vehicles, in particular in aircraft, for projecting images comprising information for passengers and/or crew onto a projection area, for example a wall, a ceiling element or the like, which projection area is arranged in the vehicle, with the use of a projection lens that images the image contents onto the projection area, which images are generated by a light source and a projection means.

DE 10 2004 031 700 A1 describes an information display system for aircraft in which a thin film or a correspondingly printed or otherwise processed screen or an otherwise partially translucent material can be used as a projection means. In order to present static and dynamic information on projection surfaces of any desired design in combination with a high-performance light-emitting diode and suitable optics, an electronically changeable projection means in the form of a liquid crystal display is provided which can be controlled and operated by a control unit by means of a data port and data lines. The data, which is transmitted from the control unit to the liquid crystal display, can be image data or film data so that entire films can be imaged onto the projection area. High-resolution images are generated with this information display system.

From DE 199 25 318 C1 a colour image projector with time-controlled LED light sources is known, in which colour image projection large-area arrays comprising LEDs that are organised in lines and columns in the three elementary colours are used. By way of a shared image generator and a control circuit, the LEDS are controlled such that imaging takes place from sequentially generated partial images in the three elementary colours. For the purpose of increasing the overall brightness of the image, control of the LEDs, which are organised by lines and columns, follows imaging, by lines and columns, in the image generator. This colour image projector can be used to display video sequences in demonstration events, to present moving images at large events, and also in the home cinema segment.

Furthermore, EP 0 605 232 B1 describes an image projection device for generating an image display onto a projection screen. This apparatus comprises a device for emitting light, a first lens arrangement with a multitude of first microlenses, a liquid crystal display that comprises a multitude of pixels arranged in a matrix form and a shielding mask; a second lens arrangement comprising a multitude of second microlenses; and a projection lens arrangement comprising a projection lens. Furthermore, a device for generating a control signal and for its transmission to the liquid crystal display is provided, wherein the liquid crystal display controls the quantity of light that is received by each pixel depending on the control signal.

Many projectors (so-called beamers in DLP or LCD technology) are rather large and also too expensive for application in vehicles. In contrast to this, simple mini projectors with LCDs, as they are used, for example, in projection clocks, may be, due to the limited LCD transmission, far too dark and inefficient.

SUMMARY OF THE INVENTION

According to an exemplary embodiment of the invention, an LED array comprising LEDs that can be switched on and off independently of each other is used as a light source and as a projection device. The LEDs, for generating composite variable image contents, are individually addressable and controllable. Furthermore, between the LED array and the projection lens or lens arrangement a separation box comprising several chambers is arranged, wherein the chambers of the separation box are associated with an LED such that the chambers associated with the switched-on LEDs are imaged on the projection area by the projection lens as parts of the compound images determined by the switched-on LEDs, wherein the form of the chambers influences the appearance of the image reproducing the information.

This may provide for a projector as a module of an information system in vehicles, in particular in aircraft, by means of which projector the gap that may exist between static projectors (slide projectors) and dynamic projectors (beamers) may be closed, and by means of which simple image contents, for example letters or numbers, may be imaged and varied in a simple manner.

The images are projected onto a projection area such as a wall or a ceiling element of an aircraft.

Exemplary Embodiments of the invention are described in the subordinate claims. In this arrangement a projector according to the invention is characterised by the use of several mini-projectors, arranged in sequence, and by corresponding control of the LEDs of the LED arrays for generating moving images that contain information.

The invention is associated with an advantage in that the projector, which is a mini-projector, can be used as an information source in vehicles travelling in the air, e.g. aircraft, on land or in/on water, for example in order to display the seat rows or seat numbers over a large area, if need be enlarged, thus making it easier for passengers to find their allocated seats. Advantageously, changes of the simple images can in an easy way be implemented from an external or from a central point by programmed switching-on or off of the LEDs. There is a further advantage in that there may be a significant improvement in the images that reproduce the simple information, as far as their brightness, contrast and definition are concerned.

BRIEF DESCRIPTION OF THE DRAWINGS

The figures show an exemplary embodiment according to the invention, as follows.

DETAILED DESCRIPTION

The representations in the figures are diagrammatic and not to scale.

Figure 1:
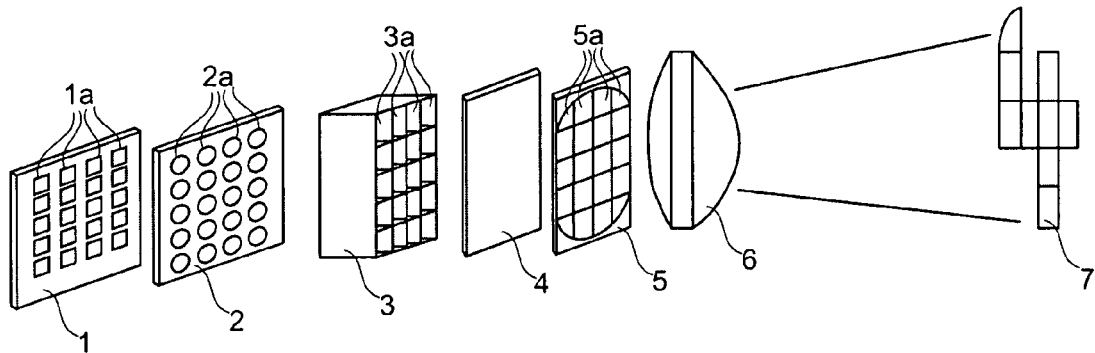
FIG. 1 shows an in-principle design of a projector of an information display system.

In FIG. 1 a LED array 1 that acts as a light source and projection means comprises (at least) 4×5 LEDs 1a. Each light emitting diode (LEDs 1a) can be switched on or off individually and independently of each other by a control device (not shown) so that from the switched-on LEDs an image 7 that reproduces information is composed, which image 7 is projected onto a projection area by means of projection optics 6, if applicable by means of deflection mirrors (also not shown). The projection area can, for example, be a wall, a ceiling element or the like in an aircraft, wherein the resolution of the projected image is better the greater the number of switched-on LEDs.

Between the LED array 1 and the projection lens 6 the following are arranged: a separation box 3 comprising several chambers 3a to improve the image 7, as well as a lens array 2 comprising a number of lenses 2a that corresponds to the number of the LEDs 1a to collect and align the light emitted by each associated LED 1a. Each of the chambers 3a of the separation box 3 is associated with a LED 1a or a lens 2a of the lens array 2 such that the chambers 3a associated with the switched-on LEDs are imaged on the projection area as parts of the composite image 7 determined by the switched-on LEDs 1a by the projection lens 6. In this process the shape of the chambers 3a influences the appearance of the image 7 reproducing the information.

Figure 2:
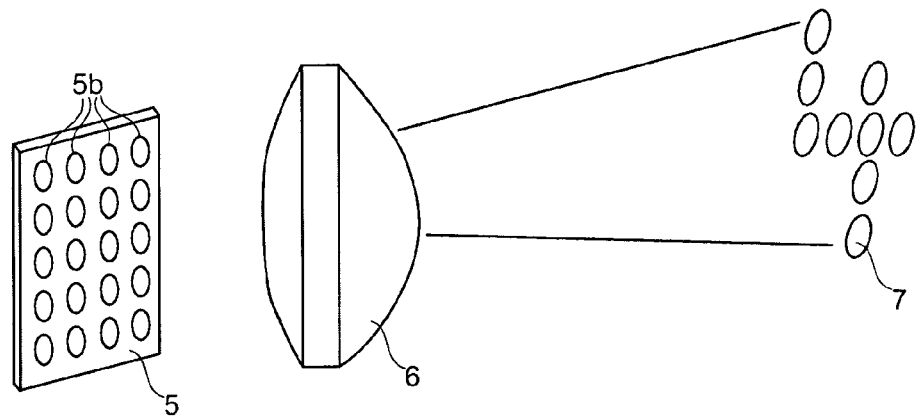
FIG. 2 shows a passepartout (mask) for generating a modified design of imaged information.

In order to improve the homogeneity of the illuminated image 7 a diffuser disc 4 is arranged in an integrated manner on the surface of the separation box 3, which surface faces the projection lens 6. Moreover, on this surface of the separation box 3 a colour filter (not shown in the drawing) can be arranged. In principle, a colour filter can be positioned at any desired location between the LED array 1 and the projection lens 6. Furthermore, for creating and improving the contrast of the projected image 7, a passepartout (mask) 5 can be arranged between the separation box 3 and the projection lens 6, which passepartout comprises a number of openings 5a that corresponds to the number of LEDs 1a and chambers 3a of the separation box 3. The passepartout 5 can also be used to generate a modified design of imaged information 7. To this effect a passepartout 5 with individually designed openings 5b is arranged upstream of projection optics 6 as shown in FIG. 2.

Figure 3:
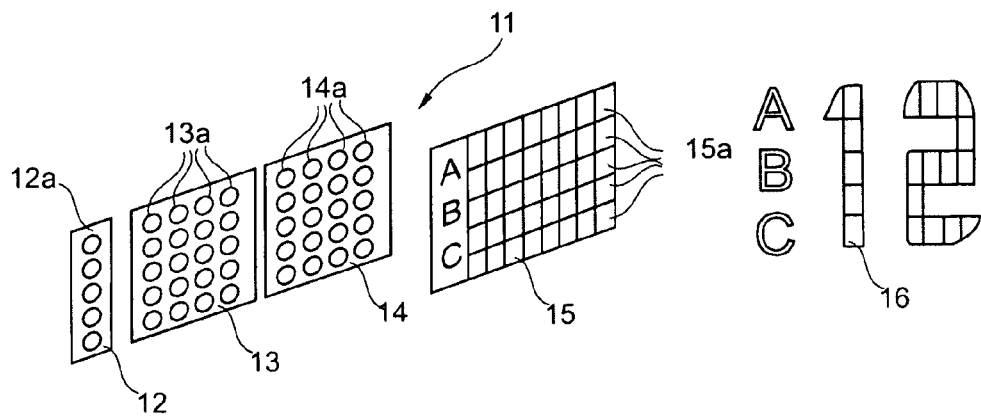
FIG. 3 shows an array arrangement for generating a combined projected image of fixed (static) image contents and variable (dynamic) image contents.

In FIG. 3 an array arrangement 11 comprises a LED array 12 to generate fixed (static) image contents, as well as comprising two LED arrays 13 and 14 to generate variable (dynamic) image contents. In this arrangement, three lens arrays (not shown in the drawing) and a separation box (also not shown in the drawing) may be used, whose chambers match the LED arrays in the same way as is the case with the openings 15a of the passepartout 15. A combined projected image 16 of fixed (static) image contents and variable (dynamic) image contents can, for example, be achieved by fixed and predetermined control of the LEDs 12a of the LED array 12, as well as by variable control of predetermined LEDs 13a/14a of the two LED arrays 13 and 14.

In the arrangements shown, with the use of LED arrays that comprise LEDs in the elementary colours or red, green and blue (RGB LEDs) it is also possible to generate projection images in colour.

LIST OF REFERENCE CHARACTERS

1 LED array with LEDs 1a
2 Lens array with lenses 2a
3 Separation box with chambers 3a
4 Diffuser disc
5 Passepartout (mask) with openings 5a or 15b
6 Projection lens
7 Image that reproduces simple information
11 Array arrangement
12 LED array for static image contents with LEDs 12a
13 LED array for dynamic image contents with LEDs 13a
14 LED array for dynamic image contents with LEDs 14a
15 Passepartout (mask) with openings 15a
16 Combined image

The invention claimed is:

1. A projector of an information display system in vehicles for projecting images comprising information for passengers or crew members onto a projection area,
wherein the projection area is arranged in the vehicle;
wherein the projector comprises:
a projection lens that images the image contents onto the projection area,
a first LED array comprising a plurality of LEDs that can be switched on and off independently of each other for acting as a light source and as a projection device for generating the images;
a separation box arranged between the first LED array and the projection lens, said separation box comprising a plurality of chambers; and
a passepartout with a plurality of openings whose number corresponds to the number of the LEDs and the number of the chambers of the separation box for improving design and contrast of the projected image, said passepartout arranged downstream of the separation box,
wherein for generating composite variable image contents, each of the plurality of the LEDs can be individually controlled;
wherein each of the chambers of the separation box is associated with a respective LED such that a chamber associated with a switched-on LED is imaged on the projection area by the projection lens as a part of the compound image determined by the switched-on LED; and
wherein the form of the chambers influences the appearance of the image reproducing the information.

2. The projector of claim 1, further comprising a lens array comprising a plurality of lenses, said lens array arranged between the first LED array and the separation box, wherein the number of the lenses corresponds to the number of the LEDs for collecting and orienting the light emitted from each associated LED.

3. The projector of claim 1, further comprising a diffuser disc to improve a homogeneity of the illuminated image, said diffuser disc arranged on a surface of the separation box, which surface faces the projection lens.

4. The projector of claim 1, further comprising a color filter arranged between the first LED array and the projection lens.

5. The projector of claim 1, further comprising at least a second LED array, at least one of said first and second LED arrays comprising LEDs in the elementary colors of red, green and blue to generate color image contents.

6. The projector of claim 1, further comprising:
at least a second LED array;
a fixed and predetermined control of the LEDs of one of the first and second LED arrays for generating static image contents; and
a variable control of predetermined LEDs of other of the first and second LED array for generating dynamic image contents,
wherein said fixed and predetermined control and said variable control are configured to generate a combined projected image of the static image contents and the dynamic image contents.

7. A projector comprising a plurality of mini-projectors, arranged in sequence, the mini-projectors projecting images comprising information for passengers or crew members onto a projection area,
wherein the projection area is arranged in the vehicle;
wherein the projector comprises:
a projection lens that images the image contents onto the projection area, an LED array comprising a plurality of LEDs that can be switched on and off independently of each other for acting as a light source and as a projection device generating the images;

a separation box arranged between the LED array and the projection lens, said separation box comprising a plurality of chambers; and a passepartout with a plurality of openings whose number corresponds to the number of the LEDs and the number of the chambers of the separation box for improving design and contrast of the projected image, said passepartout arranged downstream of the separation box, wherein for generating composite variable image contents, each of the plurality of the LEDs can be individually controlled;

wherein each of the chambers of the separation box is associated with a respective LED such that a chamber associated with a switched-on LED is imaged on the projection area by the projection lens as a part of the compound image determined by the switched-on LED;

wherein the form of the chambers influences the appearance of the image reproducing the information; and wherein the LEDs of the LED arrays are controlled for generating moving writing that contains information.

8. A projector for displaying information comprising:

a first LED array comprising a plurality of LEDs, wherein each LED of the plurality of LEDs can be controlled independently of each other for acting as a light source and as a projection device for generating images;

a separation chamber comprising a plurality of chambers wherein each chamber is associated with one of said plurality of LEDs such that each of said plurality of chambers separates the light emitted by each associated LED;

a projection lens that projects the separated light onto a projection area to form a projected composite image where separated light from each chamber remains separate and not superimposed on the projection area; and a passepartout comprising a plurality of openings, said passepartout arranged downstream of the separation box, wherein the number of the openings corresponds to the number of the LEDs and the number of the chambers of the separation box.

9. The projector of claim 8, further comprising a lens array comprising a plurality of lenses wherein each lens is associated with an LED of the first LED array, and wherein the lens array is situated downstream of the first LED array and upstream of the separation box.

10. The projector of claim 8, further comprising a diffuser disc positioned on a surface of the separation box, which surface faces the projection lens.

11. The projector of claim 8, further comprising a color filter positioned between the first LED array and the projection lens.

12. The projector of claim 8, wherein each of the LEDs is an LED selected from the elementary colors of red, green and blue to generate color image contents.

13. The projector of claim 8, further comprising:
at least a second LED array;
a fixed and predetermined control of the LEDS of one of the first and the second LED arrays for generating static image contents; and
a variable control of predetermined LEDs of the other of the first and the second LED arrays for generating dynamic image contents,
wherein said fixed and predetermined control and said variable control are configured to generate a combined projected image of the static image contents and the dynamic image contents.

14. The projector of claim 8, wherein the projector is adapted for use in a vehicle.

* * * * *